United States Patent
Ringle

[15] 3,678,363
[45] July 18, 1972

[54] AUTOMATIC BATTERY CHARGER WITH MULTIPLE RATE CHARGING

[72] Inventor: Richard Bertrem Ringle, Milwaukee, Wis.
[73] Assignee: Globe-Union Inc., Milwaukee, Wis.
[22] Filed: April 6, 1970
[21] Appl. No.: 25,916

[52] U.S. Cl. ........................................... 320/24, 320/39
[51] Int. Cl. ............................................... H02j 7/10
[58] Field of Search ............... 320/33, DIG. 2, 39, 40, 48, 320/22–24

[56] References Cited

UNITED STATES PATENTS

| | | | |
|---|---|---|---|
| 3,018,432 | 1/1962 | Palmer | 320/39 X |
| 3,111,617 | 11/1963 | Cady | 320/39 |
| 3,382,425 | 5/1968 | Legatti | 320/32 |
| 3,392,317 | 7/1968 | Eberts et al. | 320/23 |
| 3,405,341 | 10/1968 | Buch et al. | 320/33 |
| 3,412,308 | 11/1968 | Brown | 320/32 X |
| 3,441,829 | 4/1969 | Perkins et al. | 320/DIG. 2 |
| 3,487,284 | 12/1969 | Cady | 320/40 X |
| 3,493,837 | 2/1970 | Sparks et al. | 320/40 X |
| 3,517,294 | 6/1970 | Ruben | 320/24 |
| 3,517,295 | 6/1970 | Lapuyade | 320/32 |
| 3,535,600 | 10/1970 | Cramer et al. | 320/40 X |
| 3,553,562 | 1/1971 | Woods | 320/39 X |

Primary Examiner—J. D. Miller
Assistant Examiner—Robert J. Hickey
Attorney—Pendleton, Neuman, Williams & Anderson

[57] ABSTRACT

A battery charging circuit is disclosed having a multiple mode program of operation for fully automatic battery charging. In a first mode a rectified power supply provides a constant charging current flow to the terminals of a substantially discharged battery. In a second mode, initiated when a prescribed minimum charge is reached, the flow of charging current and the resultant rate of charge are reduced as the battery terminal voltage approaches a certain percentage of full charge. In a third mode, initiated at a prescribed intermediate voltage, charging continues through an unregulated rectified power supply until a maximum terminal voltage is reached. The unregulated current supply is cut off when the maximum voltage is reached, and the limited current supply comes back on in a fourth standby mode which impresses a float voltage upon the battery. This mode continues until the battery is discharged below the prescribed minimum voltage or another battery is connected to the charging circuit, at which time the program is automatically repeated.

13 Claims, 1 Drawing Figure

PATENTED JUL 18 1972
3,678,363
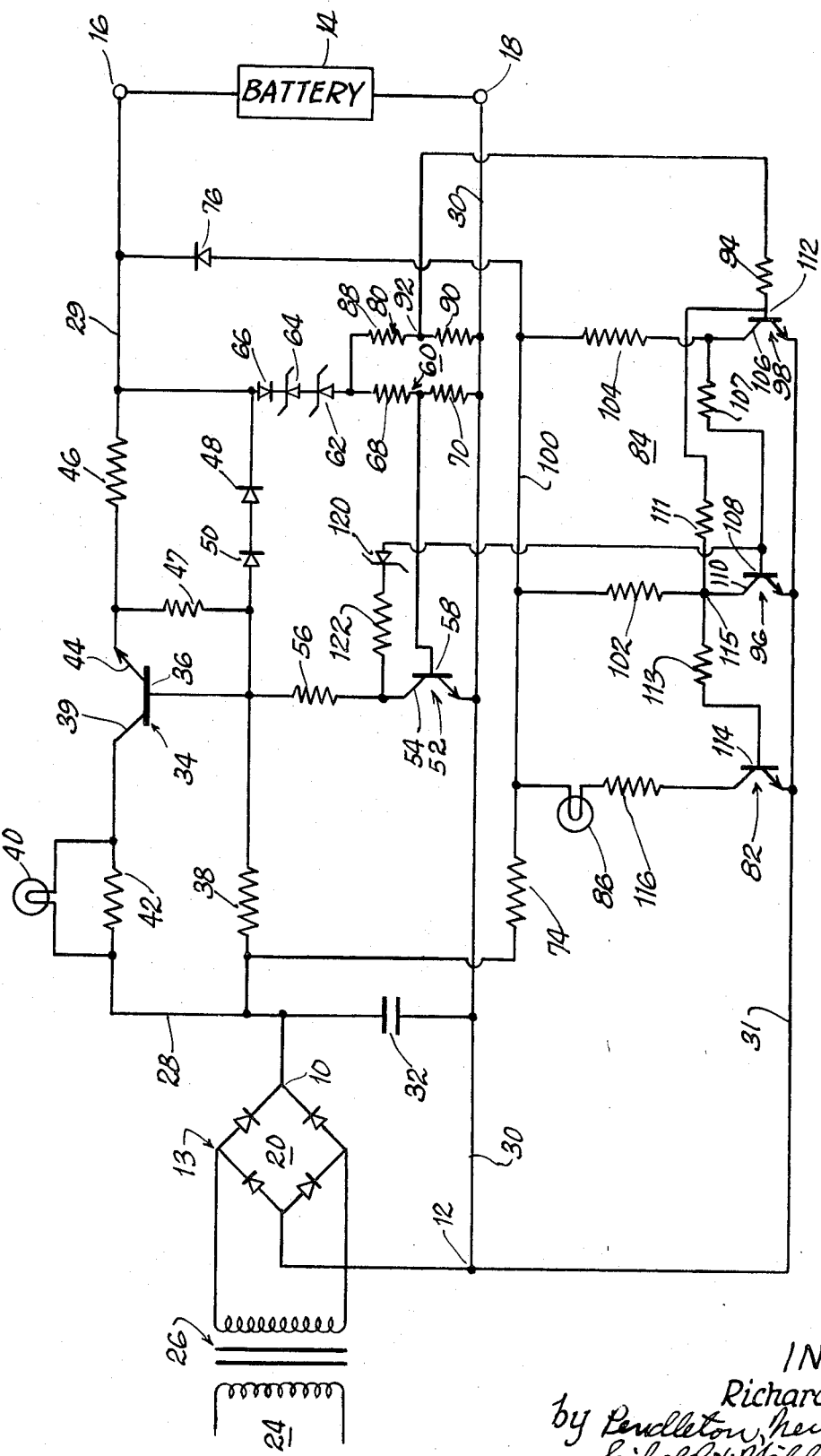
INVENTOR
Richard B. Ringle
by Pendleton, Neuman,
Seibold & Williams
Attys

AUTOMATIC BATTERY CHARGER WITH MULTIPLE RATE CHARGING

FIELD OF THE INVENTION

The invention relates to battery chargers and more particularly to a system for automatically recharging a battery having a certain stage of discharge.

BACKGROUND OF THE INVENTION

Battery operation of many types of electrical and electronic devices has become increasingly popular with the development of compact, portable equipment in many fields. Storage batteries are also often used as accurate noise-free power supplies for lower level measuring instruments. However, to maintain convenience and economy in battery operation, means must be provided for quickly and economically recharging a storage or secondary battery when it is expended or discharged.

Battery recharging can be done manually, but the procedure is inconvenient and requires a large investment in man-hours to monitor the operation and optimum charging rates and programs are rarely achieved. This is especially the case in one known method, that of gradually lowering the charging current as the charge progresses, a practice which requires an operator's constant attention. To reduce the expense involved, the practice gradually evolved of charging the battery at a constant rate for a period recommended by the manufacturer, then lowering the charging rate for another fixed period or continuing charging on a "trickle" basis. Unfortunately batteries charged using this method often received no attention at all, resulting in improper charging. Thus automatic battery chargers become convenient and even mandatory.

Two prior art practices in automatic battery charging involve coupling a battery to a constant potential source for a relatively rapid charge or applying thereto a continuous trickle of charging current. In the constant potential system, the battery is charged whenever its terminal voltage falls below an established threshold and then at a rapid rate. Unfortunately, if the battery is to be kept fully charged the threshold at which charging is initiated is so near the full battery potential that frequent high rate charging results with consequent deleterious gassing. A trickle current system supplies a current of low magnitude to prevent gassing, but the charge rate is so slow as to be impractical for charging a substantially discharged battery.

An operative automatic battery charger must neither overcharge nor undercharge the battery. Overcharging causes corrosion of the plates, excessive gassing and subsequent battery failure; excessive temperature rise and water loss may also occur.

Undercharging causes a gradual depletion and deterioration of the cells. Consistent undercharging causes some cells to become exhausted before the others and thereby become reversed by the other cells of the battery, emphasizing the effects of manufacturing variations.

Efforts have been made to combine the basic two modes of charging into an automatic system, but in general optimum results have not been obtained. Thus an automatic battery charger capable of charging a battery to reliably obtain and maintain a controlled state of charge on a battery, with total elimination of any need for monitoring the charging operation would solve a long felt need in the battery industry and be a significant advancement of the art.

SUMMARY OF THE INVENTION

A battery charger is disclosed which is capable of maintaining a battery fully charged and in a constant state of readiness.

The battery charger follows a programmed mode of operation, with the steps in the program being determined by the state of charge or terminal voltage of the battery as sensed by the voltage measuring circuits of the battery charger as well as the history of the charging sequence. The battery is thus quickly taken from the state of deep discharge to a prescribed maximum voltage, and maintained indefinitely in this fully charged state. The charge cycle is repeated if it is interrupted, although on a different time base.

Should a deeply discharged battery be coupled to the output terminals of the charging circuit, charging current immediately begins to flow from a source of charging current to the battery. The battery is charged by a substantially constant current to a prescribed minimum terminal voltage as measured by a voltage sensing and measuring circuit. At the prescribed level a variable resistance current limiting device is activated. The resistance of the current limiting device is controlled by a signal from the voltage measuring circuit, and as the battery's terminal voltage rises the limiting action of the variable resistance is increased. When the battery reaches a prescribed intermediate voltage the flow of charging current through the limiting circuit is cut off.

A small unregulated current is now the only charging current flowing from the current source to the battery. This "trickle" current pushes the battery terminal voltage toward the prescribed maximum voltage. When the terminal voltage reaches the prescribed maximum voltage, the unregulated trickle supply is cut off.

Thus this battery charging circuit provides the theoretically optimum sequence of a maximum rate of charge from a deeply discharged state to a prescribed minimum voltage level, a proportionately reduced rate of charge to a prescribed intermediate level, and then a trickle current to charge the battery at the prescribed optimum voltage level. No supervision is required for this device and the battery attached is always ready to be used. Monitoring lights are supplied which indicate either that charging current is flowing through the limiting circuit or that the battery is fully charged. Further, since all the prescribed voltage levels are fixed by either voltage dividers or a zener diode these levels may be changed by changing the resistance values or breakdown value from those of the preferred embodiment, thus providing longer periods of fast or slow charge as desired, or a higher or lower full charge terminal voltage.

Means are also supplied for automatically applying a float voltage to the battery upon completion of the charging program, insuring a fully charged battery at all times.

Means are also provided for automatically restarting the charging program should the attached battery become discharged, the charging cycle interrupted, or a new battery attached. Should the battery terminal voltage for any reason fall below the prescribed minimum voltage, the limited current and unregulated current supplies both come back on, restarting the charging program and recharging the battery. Thus the battery charger may be left hidden or in a remote location, without any need for human supervision to initiate the charge program or supervise the charge rate.

DESCRIPTION OF A PREFERRED EMBODIMENT

Referring now to the drawing, a preferred embodiment of a battery charging circuit is shown which is constructed in accordance with the teachings of the present invention.

The battery charging circuit is coupled to the D.C. supply voltage appearing at terminals 10 and 12 of a source of D.C. power 13. A battery 14 which is to be charged is coupled across output terminals 16 and 18.

The power source in this preferred embodiment includes rectifier 20 which provides a full wave rectified D.C. voltage output. Input power for rectifier 20 is supplied from an A.C. current source 24 such as a commercial A.C. power line which is coupled to the rectifier 20 through a step-down transformer 26. In a preferred embodiment an A.C. line voltage of 110 volts at 60 Hz. is applied to transformer 26 and the input voltage to rectifier 20 from the secondary of transformer 26 is 25.2 volts. A current return path or negative ground bus is furnished by lead 30 and is connected to rectifier terminal 12. A filter capacitor 32 is connected between the output terminals 10 and 12 of rectifier 20.

In the preferred embodiment a transistor 34 controls the flow of charging current through the battery 14 in the second or regulated mode of the charging cycle described above. The transistor, which is disclosed as an NPN type, controls current by acting as a variable resistance under the control of the bias voltage applied to its base 36.

A resistor 38 connects the base 36 of transistor 34 to the positive D.C. supply terminal 10. The collector 39 is connected to terminal 10 through charging indicator light 40, its associated current bypass resistor 42, and conductor 28 whereas the emitter 44 is connected to the output terminal 16 through resistor 46 and conductor 29. The emitter 44 is also connected to the base 36 through biasing resistor 47. Power supply 13 supplies current via resistor 38, and the biasing network comprising resistors 46 and 47 and diodes 48 and 50. By selecting resistor 47 large relative to resistor 46 substantially the entire drop across diodes 48 and 50 appears as a bias voltage. Thus the base-emitter circuit of transistor 34 is forward biased, turning transistor 34 on and supplying charging current to the battery. The charging current is limited by a relatively small resistor 46. Assuming for the purpose of this disclosure that a deeply discharged battery is coupled across terminals 16 and 18, transistor 52 is off and thus the network of resistors 38, 46 and 47 and diodes 48 and 50 provide forward bias and transistor 34 is fully turned on. A steady current flows through its emitter-collector circuit, causing the red charging indicating light 40 to glow brightly.

As the charge on the battery reaches a prescribed intermediate terminal voltage, transistor 52 turns on and modulates the bias on transistor 34 to limit the rate of flow of charging current through the transistor 34. The collector 54 of transistor 52 is connected to the base of transistor 34 through resistor 56 and its emitter is connected to ground bus 30. Transistor 52 thus forms a voltage divider with resistor 38 to bias transistor 34. A control voltage is supplied to the base 58 of transistor 52 by a voltage divider network 60 including resistors 68 and 70 connected from battery output terminal 18 through bus 30, zener diodes 62 and 64, diode 66 and positive conductor 29 to terminal 16. Transistor 52, an NPN transistor, is biased off until the voltage across battery terminals 16 and 18 exceeds the combined breakdown voltage of zener diodes 62 and 64. This breakdown voltage is equal to the prescribed minimum terminal voltage at which limiting of charging current flow is to begin. Divider network 60 cooperates with zener diodes 62 and 64 to form a terminal voltage measuring circuit whose output is proportional to the battery terminal voltage once zener breakdown voltage is exceeded. Once this zener breakdown voltage is exceeded, resistors 68 and 70 of divider network 60 supply a suitable bias voltage to the base 58 of transistor 52 to turn the transistor on.

When transistor 52 is turned on, current is drawn through resistor 38 causing the base 36 of transistor 34 to become less positive with respect to its emitter 44. Under these conditions the emitter-collector circuit of transistor 34 is less conductive, and the charging rate is proportionately reduced. During charging, the increasing battery terminal voltage across divider 60 increases the positive forward bias of transistor 52 and the current drain through its emitter-collector circuit until transistor 34 is turned off, ending charging current flow through line 28. As current flow in line 28 decreases, charge indicating light 40 dims and goes out. In a preferred embodiment for charging a nominal 12 volt battery, the charging current supply through lead 28 is fully cut off at a prescribed intermediate battery terminal voltage of 13.6 volts.

An additional benefit gained from a battery charging circuit constructed in accordance with this invention is that the current control system which includes transistors 52 and 34 and zeners 62 and 64 is substantially independent of fluctuations in applied A.C. line voltage or the like, This is in part because the basic charging program of the circuit is controlled by the zener diodes 62 and 64 (which sense battery terminal voltage) rather than a line voltage or charging current.

The only effective charging current which continues to flow after transistor 34 is cut off, neglecting leakage current through the turned-off transistor, is an unregulated charging current applied to the battery from terminal 10 through resistor 74, conductor 100 and diode 76 to positive battery terminal 16. Because of the difference in rectifier output voltage and battery terminal voltage, a forward bias is placed on the diode 76, allowing the unregulated charging current to flow. Resistor 74 is chosen to limit the flow of current to a desired, relatively low level. This unregulated charging current slowly raises the battery terminal voltage above the prescribed intermediate voltage level at which transistor 34 is cut off.

In keeping with the fully automatic batter charging program provided by this invention, means are incorporated in the terminal voltage measuring means described above for generating a signal indicating that the battery has reached a maximum terminal voltage while charging, and means are provided for cutting off the flow of unregulated current in response thereto. The signal generating means includes basically a voltage divider 80 connected in parallel with voltage divider 60. The output at point 92 represents the battery terminal voltage. The unregulated current cut off means includes a transistor switch 82 and a bistable multivibrator 84 connected for driving the switch. In accordance with this invention it holds the switch 82 open during the full cycle for an undercharged battery. Multivibrator 84 changes state when the output signal from divider 80 indicates that the battery has reached its prescribed maximum terminal voltage under charge. In response to this change of state, switch 82 closes, bypassing the unregulated current to ground bus 31, and energizing a green light 86 which indicates that the battery between terminals 16 and 18 is fully charged.

The battery charge indicating voltage is tapped from common terminal 92 and connected to the input of multivibrator 84 via current limiting resistor 94. It can be seen that multivibrator 84 includes transistors 96 and 98 whose collectors are connected to unregulated current supply line 100 by resistors 102 and 104. The collector 106 of transistor 98 is connected by resistor 107 to the base 108 of transistor 96; to complete the multivibrator interconnections, the collector 110 of transistor 96 is returned by resistor 111 to the base 112 of transistor 98. Until the optimum battery voltage is reached the base of transistor 98 is held at a potential close to the negative bus 31 and thus transistor 98 is off and transistor 96 is on. Resistors 88 and 90 of the terminal voltage measuring means are so chosen that when the battery terminal voltage reaches the prescribed optimum value, which in this preferred embodiment is 14.6 volts, base 112 of transistor 98 is biased positively with respect to the emitter. As a result multivibrator 84 changes state i.e., transistor 98 is turned on and transistor 96 is turned off, as the potential at base 108 falls and the base goes negative with respect to the emitter. With transistor 96 on, point 115 was at a low potential turning switch 82 off. When transistor 96 is turned off the resulting increase in potential at point 115 and current flow through coupling resistor 113 to the base 114 of NPN transistor 82 renders the transistor conductive. The resistance of the emitter-collector circuit of transistor 82 falls, resulting in an increased current flow through light 86 and its associated current limiting resistor 116, lighting the green light and bypassing the current in conductor 100. The values of resistors 74 and 116 are chosen so that the diode's anode voltage is lower than the battery terminal voltage supplied to the cathode, reverse biasing the diode 76 and cutting off the flow of unregulated charging current to the battery.

Another feature of a circuit constructed in accordance with this invention is that means are provided which cooperate with the unregulated current cut off means for switching the battery charger to a standby mode, whereby a float voltage is supplied to the battery transistors through transistor 34. Transistor 34 is turned off initially by the charging voltage resulting from current flow through resistor 74, conductor 100 and diode 76. When this is eliminated by switch 82, transistor 34 again modulates a small trickle current. In the preferred embodiment the battery is now floated at 13.6 volts where it may be held for an indefinite period without damage.

The battery charging circuit disclosed herein further includes means for automatically restarting the charging cycle when the voltage across output terminals 16, 18 falls below the breakover voltage of the zener diodes 62 and 64, which determine the prescribed minimum battery terminal voltage. Should this occur, the zener diodes return to their non-conductive state, severely reducing the voltage drop across voltage divider 60 and thereby the base bias of transistor 52. The transistor is fully turned off and becomes non-conductive. The voltage at collector 54 increases sharply, turning transistor 34 fully on. In addition, the voltage at collector 54 is applied to zener diode 120 through resistor 122 and exceeds its breakdown voltage, making zener 120 a low resistance element. The resulting current flow through resistor 122 and zener 120 into the base 108 of transistor 96 is sufficient to turn the transistor on. In response thereto the other transistor 98 of multivibrator 84 is reset into the cut off mode; the low collector-emitter voltage of transistor 96 also forces transistor 82 into cut off, making its collector-emitter circuit non-conductive and turning off light 86. Further, the voltage at the anode of diode 76 rises, restoring forward bias to the diode which is thereby returned to the conductive mode. Unregulated charging current now flows through line 100 to the battery. The system thereby automatically resets itself and recycles whenever the voltage across terminals 16, 18 falls.

In an illustrated application wherein the voltage supplied to rectifier 20 is to be 25.2 volts, charging current is to be supplied to the battery until it reaches a prescribed intermediate terminal voltage of 13.6 volts, unregulated current is to be supplied to the battery until it reaches a charge of prescribed maximum voltage of 14.6 volts, the component values for a particular battery charging circuit constructed according to the present inventors are as follows: The values are given for example only.

| Diodes | |
|---|---|
| Rectifier 20 | 4 diodes, IN4001 |
| D48 | IN 645 |
| D50 | IN 645 |
| D66 | IN 645 |
| D76 | IN 645 |
| Zener D62 | IN5235 |
| Zener D64 | IN5235 |
| Transistors | |
| Power Trans. Q34 | 40313 |
| Q52 | NPN Silicon 2N697 |
| Q82 | NPN Silicon 2N697 |
| Q96 | NPN Silicon 2N697 |
| Q98 | NPN Silicon 2N697 |
| Capacitor | |
| C32 | 500 mfd, 50V. |
| Resistors | |
| R38 | 820 ohm, 2W. |
| R42 | 18 ohm, 2W. |
| R46 | 3.8 ohm, 2W. |
| R47 | 1 Kohm, ½W. |
| R56 | 330 ohm, 1W. |
| R68 | 100 ohm, ½W. |
| R70 | 1 Kohm, ½W. |
| R74 | 200 ohm, 10W. |
| R88 | 560 ohm, ½W. |
| R90 | 470 ohm |
| R102 | 680 ohm, ½W. |
| R104 | 820 ohm, ½W. |
| R107 | 4.7 Kohm, ½W. |
| R111 | 4.7 Kohm, ½W. |
| R113 | 2.2 Kohm, ½W. |
| R116 | 82 ohm, 2W. |
| R122 | 2.2 Kohm, ½W. |

While components set forth above are for a single preferred embodiment of a charging circuit constructed in accordance with this invention, it should be readily apparent to those skilled in the art that the disclosed battery charging circuit is readily adaptable to provide different voltage levels as required. The components values need merely be altered to meet the specific desired charging characteristics. Other transistors may also be substituted for those specifically disclosed herein, provided again that suitable changes in component values are made. In fact PNP type transistors may be substituted for the NPN transistors specifically disclosed provided that the polarity of the rectifier is reversed and necessary changes in component values are made.

While a particular embodiment of this invention is shown above and described, it will be understood, of course, that the invention is not to be limited thereto, since many modifications may be made. It is contemplated, therefore, by the appended claims, to cover any such modifications as fall within the true spirit and scope of this invention.

I claim:

1. In a battery charging circuit having input and output terminals and coupled between a source of charging current and a battery to be charged to a prescribed terminal voltage, the combination which comprises:

controllable means associated with the charging current source for limiting the flow of charging current to said battery, measuring means connected across said output terminals for developing a signal proportional to the terminal voltage of said battery, voltage responsive means disposed between said measuring means and said current limiting means and responsive to said voltage proportional signal for initiating the flow of charging current to the battery in response to a signal indicating a prescribed minimum terminal voltage existing across said output terminals, and cutting off the flow of charging current in response to a signal indicating a prescribed intermediate terminal voltage, so that said battery charger is capable of continuous fully automatic operation, means for supplying an unregulated charging current to said battery, and means for cutting off said unregulated charging current supply means when said prescribed maximum terminal voltage exists across said output terminals.

2. A battery charging circuit as claimed in claim 1 wherein said voltage responsive means includes zener diode means having an effective breakdown voltage at said prescribed minimum terminal voltage for generating a control signal proportional to the terminal voltage of said battery.

3. A battery charging circuit as claimed in claim 2 wherein said control means includes interposed means between said measuring means and said controllable means and responsive to said control signal to vary the degree of current limitation by said controlable means and thereby modulate the flow of charging current to a battery whose terminal voltage is between said prescribed minimum voltage and said prescribed intermediate terminal voltage.

4. A battery charging circuit as claimed in claim 3 wherein said controllable means includes a first transistor having a base terminal and an emitter-collector resistance circuit coupled serially between said source and said battery, and said interposed means includes a second transistor coupled between the base of said first transistor and said sensing means, said second transistor controlling the resistance of said emitter-collector circuit so that said controllable means passes charging current having a magnitude related to battery terminal voltage for all terminal voltages between said prescribed minimum and said prescribed intermediate voltage.

5. A battery charging circuit as claimed in claim 1 including means for indicating that current is flowing through the controllable means.

6. A battery charging circuit as claimed in claim 1 said unregulated current supply means including a diode having its anode coupled to said current source and its cathode coupled to said battery output terminal, and said unregulated current cut off means including a switching transistor responsive to said measuring means to reverse bias said diode when said prescribed maximum voltage level is detected, cutting off said unregulated current supply means.

7. A battery charging circuit as claimed in claim 6, said measuring means including a voltage dividing means for generating a signal indicating that said battery has reached said prescribed maximum voltage level, and means associated with said unregulated current cut off means for indicating that said battery is at said prescribed maximum voltage.

8. A battery charging circuit as claimed in claim 1 including means coupled between said current source and said battery and cooperating with said current limiting means and responsive to the cut off of said unregulated current supply means to impress a float level voltage across said output terminals.

9. A battery charging circuit as claimed in claim 8 including means including a voltage divider in parallel with said first measuring means for generating a second signal proportional to said battery terminal voltage, and a bistable multivibrator having first and second transistors having first opposite conductivity states disposed between said second signal generating means and said unregulated current cut off means, said multivibrator transistors being responsive to said second signal reaching a level proportional to the prescribed maximum terminal voltage to reverse their conductivity states and thereby energize said unregulated current cut off means to cut off said unregulated current supply means.

10. A battery charging circuit as claimed in claim 9 including means for restoring the flow of unregulated current, said restoring means being coupled between said measuring means and said bistable multivibrator and responsive to the detection of said prescribed minimum voltage to return the transistors of the multivibrator to their first state.

11. A battery charger for charging a battery to a prescribed maximum voltage comprising:

controllable means for limiting the flow of charging current from a current source to the battery;

control means coupled between said battery and said controllable means for sensing the terminal voltage of said battery and responsive to a prescribed minimum terminal voltage of said battery to initiate the operation of said current controllable means to limit the flow of charging current, and responsive to a prescribed intermediate battery terminal voltage to deactivate said controllable means; said control means including measuring means coupled across the terminals of said battery and including a zener diode having an effective breakdown voltage at said prescribed minimum terminal voltage for generating a control signal proportional to the terminal voltage of said battery, and means interposed between said measuring means and said controllable means and responsive to said control signal to vary the degree of current limitation imposed by said controllable means on the flow of charging current to a battery whose terminal voltage is between said prescribed minimum voltage and said prescribed intermediate terminal voltage, and said controllable means including a first transistor having a base terminal and an emitter-collector resistance circuit coupled serially between said current supply source and said battery;

said means for varying the degree of current limiting including a second transistor coupled between the base of said first transistor and said signal generating means, said second transistor controlling the resistance of said emitter-collector circuit so that said controllable means allows charging current to flow at a maximum rate when said terminal voltage is below said prescribed minimum level, allows a diminished current flow when said terminal voltage is between said prescribed minimum and intermediate levels, and cuts off current through said controllable means at a terminal voltage equal to said prescribed intermediate level;

means for supplying unregulated current to said battery;

second measuring means cooperating with said first measuring means for generating a second control signal proportional to the battery terminal voltage; and unregulated current control means responsive to said second control signal for cutting off said unregulated current supply means when the battery reaches the prescribed maximum terminal voltage.

12. A battery charger as claimed in claim 11 further including means responsive to said unregulated current control means for impressing a float voltage on said battery terminals.

13. A battery charger as claimed in claim 12 further including means for indicating that said battery terminal voltage is below said prescribed intermediate voltage, and means for indicating that said battery terminal voltage is equal to said prescribed maximum terminal voltage.

* * * * *